(12) United States Patent
Marzocchi et al.

(10) Patent No.: US 6,386,643 B1
(45) Date of Patent: May 14, 2002

(54) QUICK RELEASABLE DROPOUT AND WHEEL HUB ASSEMBLY

(75) Inventors: Paolo Marzocchi, Bologna; Sandro Musiani, Marzabotto; Loris Vignocchi, Zola Predosa, all of (IT)

(73) Assignee: Marzocchi S.p.A., Bologna (IT)

( * ) Notice: Subject to any disclaimer, the term of this patent is extended or adjusted under 35 U.S.C. 154(b) by 0 days.

(21) Appl. No.: 09/602,954

(22) Filed: Jun. 23, 2000

Related U.S. Application Data (62) Division of application No. 09/189,448, filed on Nov. 10, 1998.

(51) Int. Cl.$^7$ .............................................. B60B 35/00
(52) U.S. Cl. .................................. 301/110.5; 301/124.2
(58) Field of Search ........................... 301/110.5, 110.6, 301/124.2, 55, 57, 59

(56) References Cited

U.S. PATENT DOCUMENTS

| 4,079,958 | A | * | 3/1978 | Segawa | 301/110.5 |
| 4,400,038 | A | * | 8/1983 | Hosokawa | 301/110.5 |
| 4,789,206 | A | * | 12/1988 | Ozaki | 301/110.5 |
| 4,880,280 | A | * | 11/1989 | Panzica et al. | 301/110.5 |
| 4,906,053 | A | * | 3/1990 | Kawai | 301/110.5 |
| 4,964,287 | A | * | 10/1990 | Gaul | 301/110.5 |
| 5,121,973 | A | * | 6/1992 | Phillips | 301/110.5 |
| 5,531,510 | A | * | 7/1996 | Yamane | 301/110.5 |
| 5,567,020 | A | * | 10/1996 | Phillips et al. | 301/124.2 |
| 5,961,186 | A | * | 10/1999 | Phillips | 301/124.2 |
| 5,997,104 | A | * | 12/1999 | Campagnolo | 301/110.5 |

FOREIGN PATENT DOCUMENTS

| GB | 205882 | * | 1/1923 | 301/110.6 |
| GB | 000573423 | * | 11/1945 | 301/110.5 |
| WO | 083003389 | * | 10/1983 | 301/110.5 |

* cited by examiner

*Primary Examiner*—S. Joseph Morano
*Assistant Examiner*—Long Bae Nguyen
(74) *Attorney, Agent, or Firm*—Ward & Olivo (57) ABSTRACT

The present invention relates generally to bicycles, and more particularly to front wheel hub assemblies for bicycles and motorcycles. Specifically, the present invention provides a novel wheel hub assembly for connecting a wheel rim to the front fork of a bicycle or motorcycle, with this same wheel hub assembly comprising an oversized single member hub-axle assembly for attachment to a fork dropout having an enlarged opening. The wheel hub assembly according to the present invention comprises an axle (or axles), a bearing assembly, a hub having flanges for connection to the wheel rim (e.g., via spokes), and a quick release clamping mechanism for securing the wheel hub assembly to the front forks of the bicycle. Additionally, the present invention provides a wheel hub assembly having an axle with an increased diameter and a dropout with an increased size at the axle/dropout interface in order to yield a more rigid interface between the wheel and fork, and provides a more stable bicycle.

30 Claims, 6 Drawing Sheets

QUICK RELEASABLE DROPOUT AND WHEEL HUB ASSEMBLY

CROSS-REFERENCE TO RELATED APPLICATIONS

This application is a divisional of application Ser. No. 09/189,448, filed on Nov. 10, 1998.

FIELD OF THE INVENTION

The present invention relates generally to bicycles and motorcycles, and more particularly to front wheel hub-axle assemblies for the same. Specifically, the present invention provides a novel wheel hub assembly for connecting a wheel rim to the front fork of a bicycle or motorcycle, with this wheel hub assembly comprising an oversized single member hub-axle assembly for attachment to a fork dropout having an enlarged opening.

BACKGROUND OF THE INVENTION

The present invention has particular application to bicycles referred to as mountain bikes or trail bikes which are typically ridden over rough terrain and/or on steep uphill or downhill slopes. The invention is also applicable to motorcycles commonly referred to as dirt bikes.

As is typical for all conventional bicycles and motorcycles, the front wheel is the steering wheel, that is, it controls the steering of the bicycle or motorcycle. The conventional apparatus used to perform this steering is described below. First, steering handles, or handlebars, are interconnected to the wheel through a fork. The fork typically has parallel legs that extend upward from each side of the wheel axle and connect at the top of the wheel to a central steering tube which is, in turn, attached to the handlebars. The central steering tube is rotatably mounted to the frame of the bicycle in a manner that supports the frame on the wheel's axle while permitting rotation of the central steering tube and thus allowing the front wheel to turn relative to the frame of the bicycle or motorcycle.

Additionally, it is conventional in the bicycle industry to use "quick-release" mounting devices or hubs for attaching the front wheel to the end piece of each leg of the bicycle front fork. Such end pieces are commonly referred to as dropouts. The use of these quick-release mounts is so commonly in bicycles because they facilitate removal of the wheel for repair, transport, storage, anti-theft, etc.

Further, of particular concern to the "off-road" bicycle rider is the jolting of the front wheel as disturbances in the ground surface, such as rocks, holes, or vertical drops, are encountered. This jolting is transferred to the rider through the wheel, fork, steering tube, steering handles, and ultimately the rider's arms. In addition to the potential discomfort to the rider, there is the added concern for safety. That is, the steering handles become difficult to control at the instant of a severe jolt being experienced by the rider through the handles.

To overcome this problem of severe jolting, designers of trail and mountain bikes have developed front wheel, shock absorbing suspension systems. These shock absorbing systems have fork legs that include a rigid rod (or inner tube), which is slidable within a rigid sleeve (or outer tube) and a biasing member which can operate pneumatically, hydraulically, elastomerically or with metallic springs, positioned within the rigid sleeve to achieve the "shock-absorbing" action. The biasing member extends the fork rode relative to the sleeves, and as obstacles are encountered by the front wheel, the biasing members of the fork's rigid sleeves collapse as the slidable rods are compressed in the sleeves, thereby absorbing the severe jolt. Additionally, the sliding rod may have a slight degree of rotatability within the sleeve.

Therefore, when an obstacle is encountered directly, the forces are substantially in the same axis as is the fork/suspension system, and the slidable rods are typically displaced uniformly However, during cornering or other maneuvering, the forces are not in the same axis as the suspension such that torsional and lateral stresses are created, and typically one of the rods is compressed or displaced into the corresponding sleeve more so than the opposite rod. Because the slidable rod has a slight degree of rotatability within the sleeve, high stresses are created at the dropout-to-axle connection when lateral and torsional forces are applied to the wheel in contact with the ground, such as in cornering.

Also, when brakes are applied in stopping or cornering, the brakes push outward and a large amount of torsion acts on the lower two fork tubes. The resistance to this torsion is mainly provided by the wheel axle and the brake arch. Thus, increased rigidity and strength are highly desired at the wheel axle and/or brake arch.

Conventional wheel axles are typically 9 mm in diameter and are detachably mounted to a wheel hub which is typically 20 mm in diameter. With rigid front fork designs (i.e., nonsuspension forks), this is a generally acceptable design because the resistance to the torsional stresses is absorbed through the wheel, fork, steering tube and steering handles in addition to the wheel hub assembly and brake arch. On the other hand, with a front fork suspension system the stresses are different. While uniform compressions relieve stress on the wheel, fork, steering tube, and steering handle, unbalanced compressions, such as from cornering and maneuvering, the stresses on the wheel axle are high. Therefore, increased rigidity and strength in the wheel axle is highly desirable for off-road bicycles and motorcycles, particularly those with front suspensions.

A typical wheel hub assembly for a bicycle or motorcycle includes an axle (or spindle), a hub and bearings (or hub-bearing assembly). In conventional assemblies, the axle is separate and removable from the hub-bearing assembly. Also, conventional fastening systems for attaching the hub-bearing assembly to the axle include received-in threaded holes in a flange on the spindle. Such a conventional system is disclosed in Wilson et al. U.S. Pat. No. 5,238,259 (Wilson). Wilson discloses adjustable dropouts which mount the wheel on the fork assembly where the fastener is removed to permit the shoe installed in the bore to have axial movement. Wilson also discloses an axle including a known quick release and clamp mechanism and operation of the lever to force an end nut toward a lock nut to thus force the end nut and lock nut against the recesses on a bracket to thus lock the axle to the bracket. Simultaneously, a spacer will be forced toward the locknut to thus force the locknut against the surface of the shoe and the spacer will be forced against the opposite surface of the shoe to lock the axle to the shoe. The fastener is then threadably inserted to clamp the shoe in position in the bracket to complete the mounting of the wheel to the fork.

Another conventional fastening system is disclosed in Pong et al. U.S. Pat. No. 5,390,947 (Pong). Pong discloses a device for fastening the wheel to the axle which includes a split tapered collet received between tapered surfaces on the wheel hub and the wheel attachment portion of the axle and a releasable latch mechanism for retaining the collet in a seated relation on the tapered surfaces.

Furthermore, an additional concern for bicycle riders is the weight of the bicycle. A lighter bicycle is more desirable because it takes less exertion on the part of the rider to power and maneuver. As such, manufacturers of high-end performance bicycles and bicycle components are continuously upgrading their bicycles and components to decrease the overall weight of the bicycle. This has typically been accomplished in at least three ways. One is to use lighter materials such as aluminum alloys and carbon-graphite components. Another is to decrease the overall number of components that comprise a bicycle. Yet another is to decrease the thickness of the components used without sacrificing their strength.

Typically, wheel hub assemblies comprise a hollow through axle with a pair of annular bearing assemblies concentrically positioned over the axle and a hollow cylindrical shell, positioned so as to prevent inward movement of the bearing assemblies. Other wheel hub designs utilize a hollow shell having raised ends (or flanges) that is positioned over the axle between the bearing assemblies, with the hub being attached to the wheel at the raised ends by spokes or some other attachment means. Still other designs use attachment rings to attach the wheel hub to the wheel rim and axle, and to separate the bearings. These designs use a hollow shell positioned over the axle to prevent inward movement of the attachment rings.

A further concern to the bicycle rider is ease of repairs when the front tire becomes, for example, punctured and repairs must be made in the field. With typical designs, the axle may become separated from the wheel hub assembly during such repairs. When this occurs, foreign particles may enter the bearing assembly, and thereby cause the wheel hub to fail.

Accordingly, it is desirable to have a wheel hub assembly for bicycles and motorcycles which includes the axle, hub and bearing in a single component. There is also a need for a wheel hub assembly which provides increased rigidity over conventional wheel hub assemblies. There is yet a further need for a wheel hub assembly designed such that the weight would be less than conventional wheel hub and axle systems.

SUMMARY OF THE INVENTION

The present invention provides a single piece wheel hub assembly comprising a hub, bearing and axle all-in-one design, as well as providing an improved interface between the front fork dropout and the wheel hub assembly. The present invention accomplishes this by (1) increasing the axle diameter above the conventional 9 mm, preferably to a diameter of 20 mm; and (2) eliminating the conventional two piece design of the hub and axle by press fitting the hub over the axle with the bearing assembly fixed within the hub.

This increased axle diameter and correspondingly increased dropout interface according to this invention yields a more rigid axle, overcomes the disadvantages of the conventional hub and axle assemblies, and imparts more stability to the rider. In conjunction with this wider dropout, there is an increase in the surface area between the axle and the dropout, also adding to the further stability of this completely new interface.

As previously mentioned, high torsional stresses occur at the dropout-to-axle interface, particularly in front suspension bicycles when cornering or maneuvering. To impart additional stability, rigidity and strength, the present invention provides an axle diameter larger than the industry standard of 9mm. Preferably, the axle diameter is 20 mm, as a synergistic improvement in rigidity is achieved as the axle diameter increases to 20 mm. This discussed in further detail below.

Yet another object of this invention is to provide a single wheel hub assembly, including the axle, hub and bearing, to provide increased strength and stability of the wheel hub assembly. Another benefit of the single piece is the decreased weight-of the wheel hub assembly. Yet another advantage of this design is that when the wheel is dismounted from the bicycle, the axle cannot separate from the hub, thereby preventing any foreign particles such as dirt from entering the hub and damaging the bearings. And still another advantage is that separate components could be combined at the front wheel hub of the bicycle.

Furthermore, whereas conventional hub and axle assemblies utilize a device to detachably fasten the axle to the hub, the present invention permanently fastens the hub to the axle. The single wheel hub assembly can be press fit using conventional means in the machining industry.

These and other advantages of the present invention will become more thoroughly apparent through the following description of the preferred embodiments and the accompanying drawings.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings is not intended to limit the scope of this invention, which is set forth with particularity in the claims as appended or as subsequently amended, but merely to clarify and exemplify the invention.

For a more complete understanding of the present invention, reference is now the following drawings in which:

FIG. 3 shows an end view of the front wheel hub assembly shown in FIG. 2a;

FIG. 7 shows a cross-sectional view of another alternate embodiment of the front wheel hub assembly shown in FIG.

1, showing a quick release mechanism in accordance with the present invention.

DETAILED DESCRIPTION OF THE PREFERRED EMBODIMENTS

As required, a detailed illustrative embodiment of the-present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The following presents a detailed description of a preferred embodiment of the present invention. As discussed above, the present invention relates generally to bicycles, and more particularly to front wheel hub assemblies. Specifically, the present invention provides a novel wheel hub assembly for connecting a wheel rim to the front fork of a bicycle or motorcycle, with this wheel hub assembly comprising an oversized single member hub-axle assembly for attachment to a fork dropout having an enlarged opening. Reference is herein made to the figures, wherein the numerals representing particular parts are consistently used throughout the figures and accompanying discussion.

Figure 1:
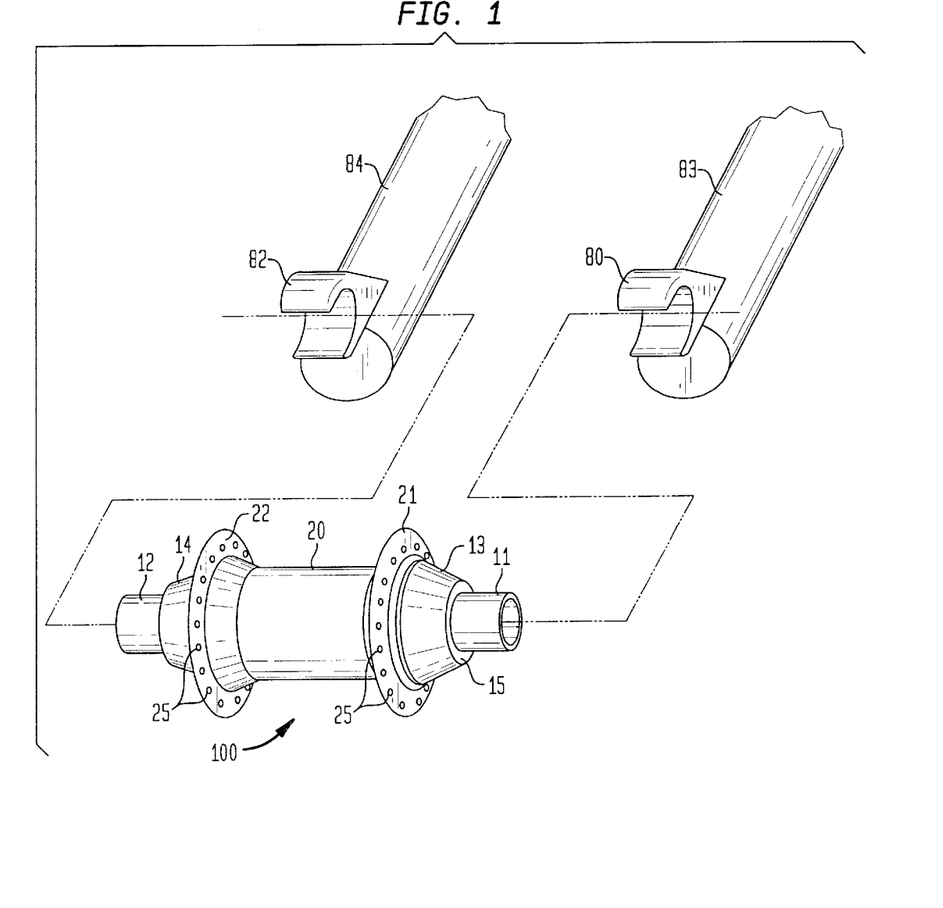
FIG. 1 shows a perspective view of a preferred embodiment of a front wheel hub assembly according to the present invention, indicating the interconnection with a front fork assembly.
Figure 4:
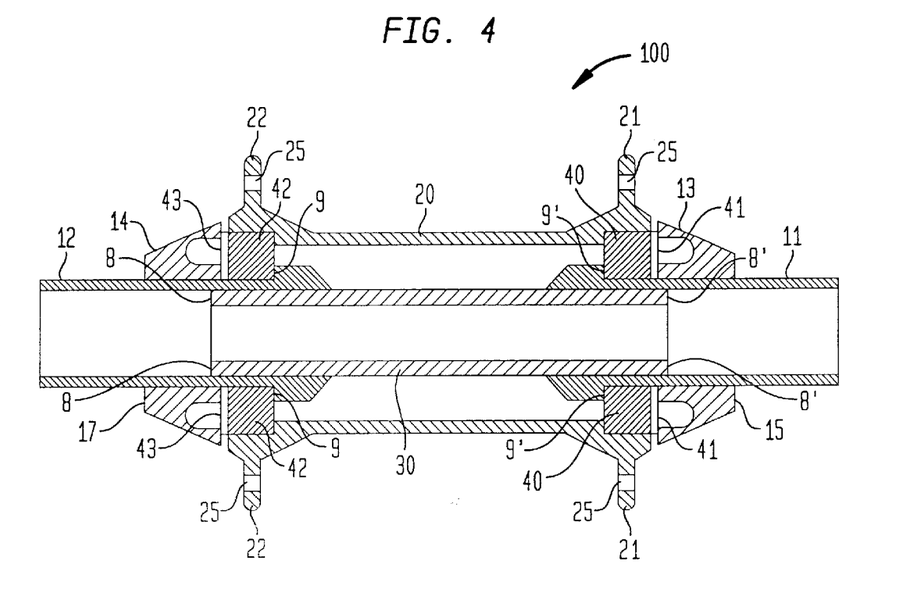
FIG. 4 shows a cross-sectional view of an embodiment of the front wheel hub assembly shown in FIG. 1, depicting an inner connecting tube and two separate axles as they are interconnected within the wheel hub assembly.

With reference first to FIGS. 1 and 4, a wheel hub assembly 100 is shown in accordance with the present invention. As indicated by the dashed lines, wheel hub assembly 100 is generally suited to be interconnected to a front fork assembly (i.e., for use with a bicycle or motorcycle). In a preferred embodiment, wheel hub assembly 100 comprises: hub 20 having flanges 21 and 22; independent axles 11 and 12 (or axle 10 (see FIG. 5)); connecting tube 30; bearings 40 and 42 (see FIG. 4); washers 41 and 43; and bearing caps 13 and 14. Bearings 40 and 42, according to the present invention, may comprise any of a plurality of known bearing assemblies. Also, hub 20 comprises flanges 21 and 22 which extend outwardly from the axis of hub 20 and have a plurality of holes 25 which provide for connection to a wheel rim via conventional means such as spokes.

In one embodiment of the invention, axles 11 and 12 are preferably press fit onto connecting tube 30 and positioned axially within hub 20. Bearings 40 and 42 are then cylindrically placed on axles 11 and 12, respectively, and press fit between axles 11/12 and hub 20 as shown. Washers 41 and 43 are positioned adjacent to bearings 40 and 42, respectively, such that bearings 40 and 42 are completely covered. Washers 41 and 43 protect bearings 40 and 42 from any particles, such as dirt, pebbles, etc., entering bearing 40 or 42, thereby significantly degrading or damaging bearings 40 and/or 42. Next, bearing caps 13 and 14 are press fit onto axles 11 and 12 respectively until they are adjacent to washers 41/43 such that they hold washers 41/43 and bearings 40/42 securely in place between hub 20 and axles 11/12. Optionally, grease or other lubricant is used in bearings 40/42 and on washers 41/43 in order that rotation of axles 11 and 12 may occur without obstruction and with minimal friction. Also optionally, bearing caps 13 and 14 may have openings on the surface adjacent to washers 41 and 43 in order to minimize the contact surface area therebetween and in turn minimize the friction created during rotation of axles 11/12.

Importantly, two features of the present invention which are not readily apparent from any of the drawings are that hub 20 and axles 11/12 are specifically designed with a much greater diameter than in conventional hubs in order to provide the increased strength, rigidity and stability that are desired in off-road riding.

Figure 3:
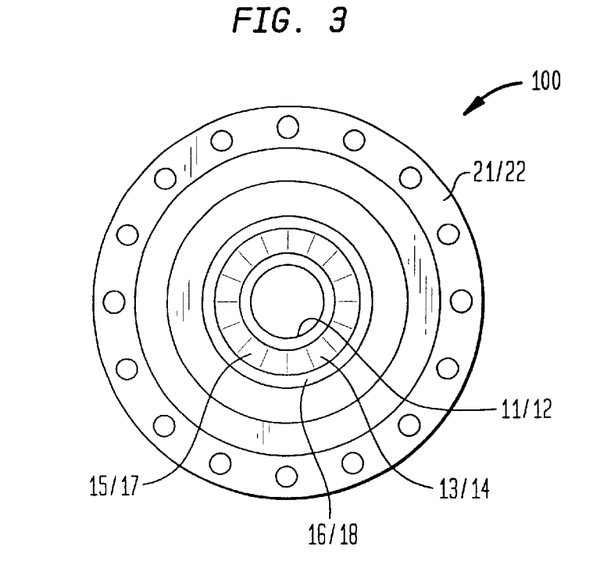
Figure 6:
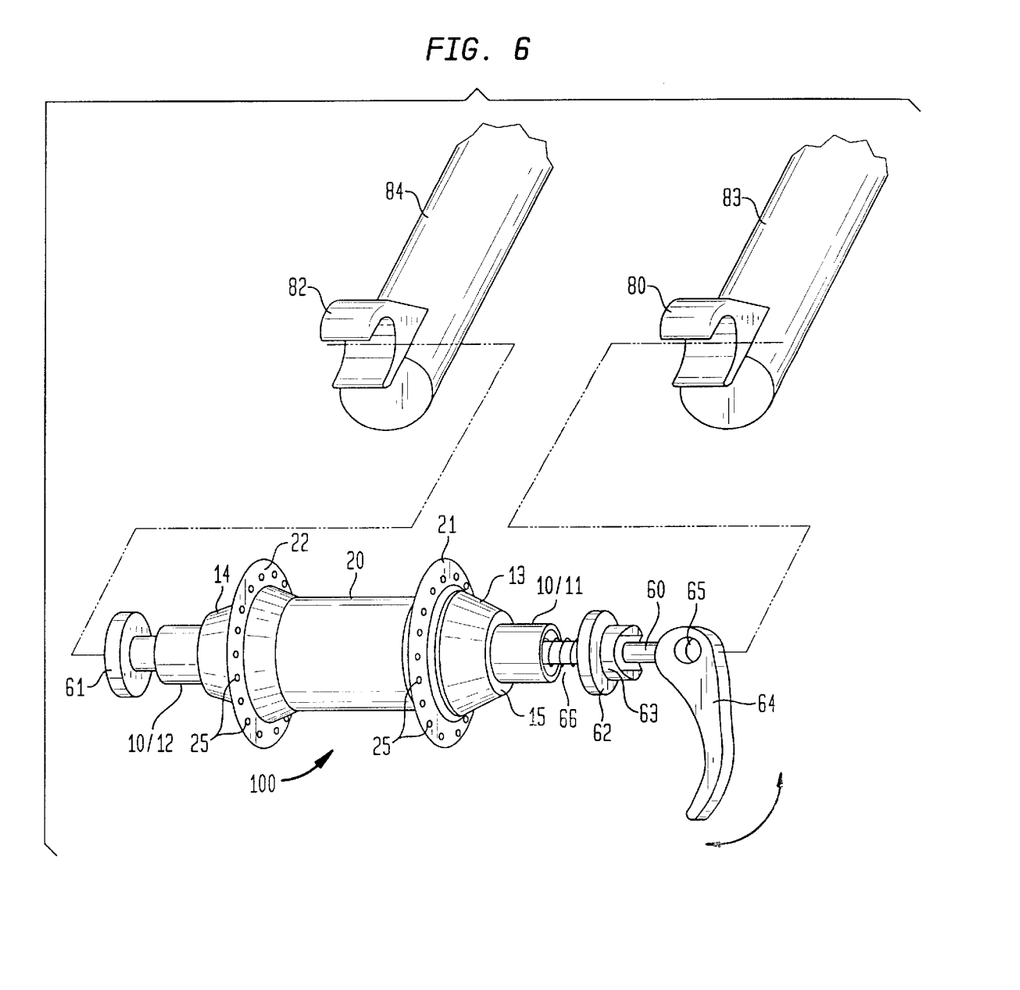
FIG. 6 shows a perspective view of the front wheel hub assembly shown FIG. 1 including a quick release mechanism in accordance with the present invention.
Figure 7:
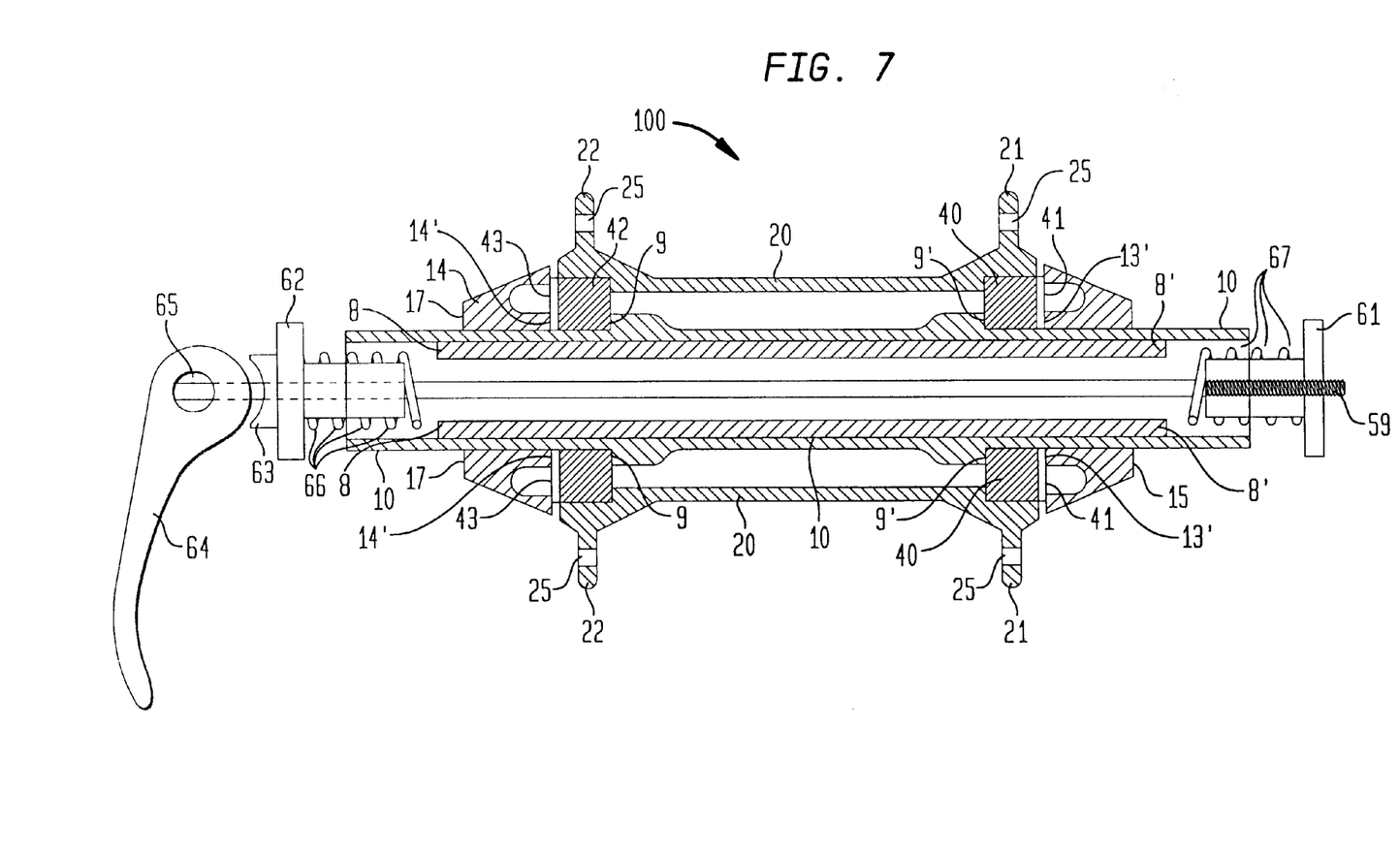

Next, referring specifically to FIG. 1, as indicated by the dashed lines, wheel hub assembly 100 is generally shown to be interconnected with a front fork assembly comprising forks 83/84 (e.g., rigid or suspension) having dropouts 80/82 (e.g., molded or independently secured). Preferably, a quick release fastening mechanism (as shown in FIGS. 6 and 7) is used to secure wheel hub assembly 100 to dropouts 80/82. Optionally, as shown in FIG. 3, edges 15/17 of bearing caps 13/14 may be grooved so that when the quick release mechanism is closed (i.e., engaged), wheel hub assembly 100 is firmly secured in dropouts 80/82, with end caps 61 and 62 forced toward each other, enclosing the outer ends of axles 11/12. The grooved edges 15/17 provide high friction between bearing caps 13/14 and the inner edges of dropouts 80/82 to prevent wheel hub assembly 100 from "slipping" out of dropouts 80/82.

Also shown in FIG. 1, wheel hub assembly 20, in accordance with the present invention, comprises flanges 21 and 22 each having a plurality of holes 25 for interconnection to a conventional wheel rim via conventional spokes. Each hole 25 is preferably tapered such that the inside diameter of the hole is less than the diameter of the hole on either side of flange 21 and 22. However, it will be appreciated that either or both ends of holes 25 may be tapered. Also, holes 25 need not be tapered, nor need they be holes at all—other openings may be used, such as grooves or slots, to facilitate attachment of the wheel hub assembly 100 to the wheel rim. Lastly, flanges 21 and 22 can be either annular as depicted in FIG. 1, or they can be individual tabs to attach the wheel hub assembly 100 to the wheel rim. In a preferred embodiment, flanges 21 and 22 are annular.

Figure 2A:
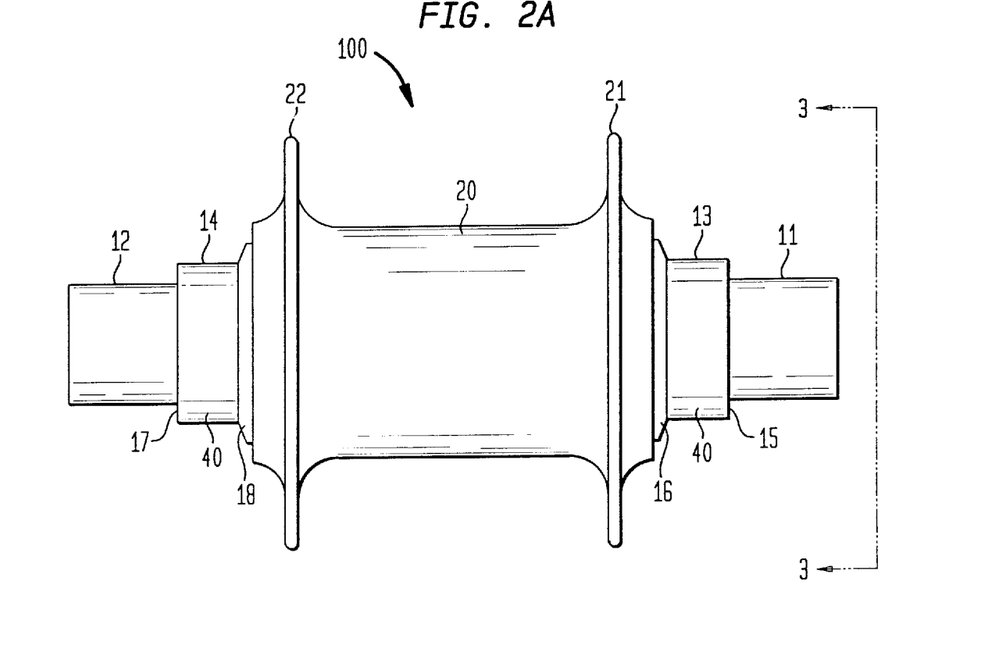
FIG. 2a shows a top view of a front wheel hub assembly in accordance with the present invention.

Referring next to FIG. 2a, an embodiment of wheel hub assembly 100 according to the present invention is shown. FIG. 2a demonstrates that the size and shapes of flanges 21/22 and bearing caps 13/14 can vary significantly in accordance with this invention. Also shown is line 3—3 which indicates an end view of wheel hub assembly 100 (see also FIG. 3). Depicted in FIG. 3 are outer edges 15/17 of bearing caps 13/14 which are optionally grooved to firmly secure dropouts 80/82 as described above.

Figure 2B:
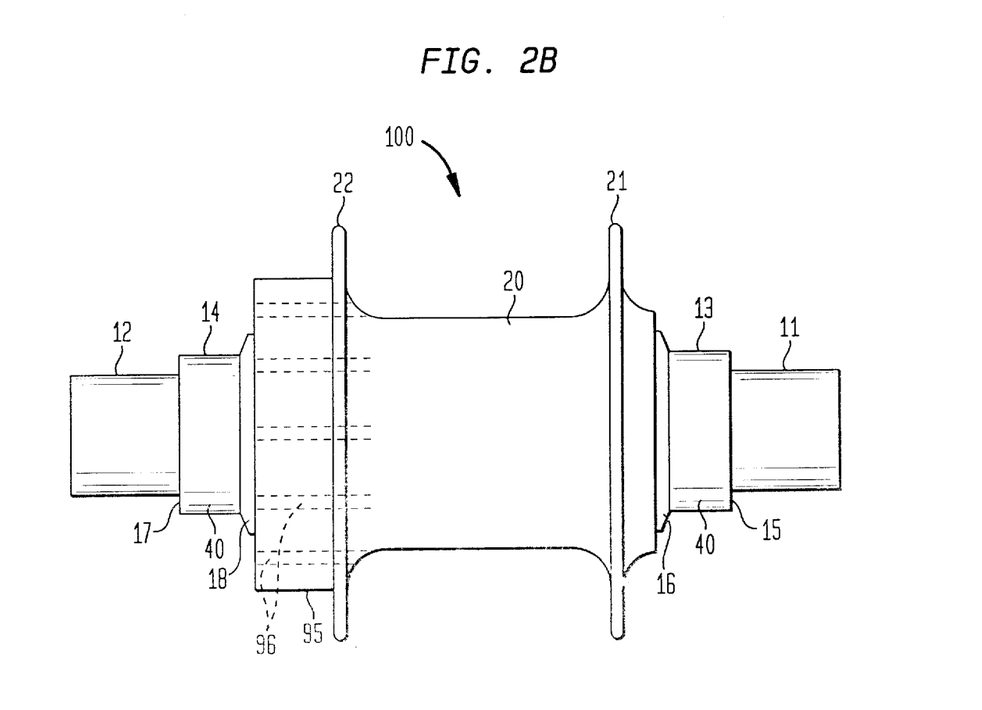
FIG. 2b shows a top view of an alternate embodiment of a front wheel hub assembly in accordance with the present invention, including a mounting means for front disc brakes.

Turning now to FIG. 2b, an alternate embodiment of the present invention includes a disc brake receiving mechanism 95 which can be incorporated into wheel hub assembly 100 between flange 22 and bearing cap 14 as shown. Disc brake receiving mechanism 95 contains a plurality of threaded holes 96, as indicated by the dashed lines in FIG. 2b which extend through receiving mechanism 95 and flange 22. Bearing 42 (see FIG. 4), instead of being positioned within hub 20 at flange 22, would in this embodiment be positioned within receiving mechanism 95 such it interacts with washer 43 and bearing cap 14 during rotation of axles 11/12 as described above.

Referring now to FIG. 4, shown is a cross-sectional view of an embodiment of the front wheel hub assembly shown in FIG. 1. More specifically, FIG. 4 shows a three piece axle assembly, a novel feature of this invention, comprising axles 11 & 12 and connecting tube 30. Typically, wheel axles have been made as single through-axles comprising one solid piece. In addition, as conventional axles have always been made at a diameter of only nine (9) millimeters (9 mm), they had to be solid axles in order to provide sufficient strength to handle the various loads applied to it during use. On the other hand, with the new increased diameter axle (preferably twenty (20) millimeters (20 mm)), not only can the axle be made with a greater diameter, it no longer needs to be a solid component. Also, the axle may comprise three components, as shown in FIG. 4. The assembly of this three component axle has been described in detail above.

Further, as previously described, axles 11/12, whether separate or a single through-axle, preferably have an outside diameter greater than the conventional 9 mm. According to the preferred embodiment of this invention, the axle diameter is 20 mm. However, it should be noted that any diameter greater than 9 mm, and more preferably greater than twelve (12) millimeters (12 mm), provide increased strength, rigidity and stability of the interconnection of wheel hub assembly 100 with dropouts 80/82. Specifically, an analysis between a conventional 9 mm axle and the 20 mm axle of this invention (provided in detail below) shows such increased strength, rigidity and stability. Preferably, axles 11 and 12 are made of strong, lightweight and highly durable material, including metals such as titanium, aluminum, etc., and composites such as graphite, etc.

Figure 5:
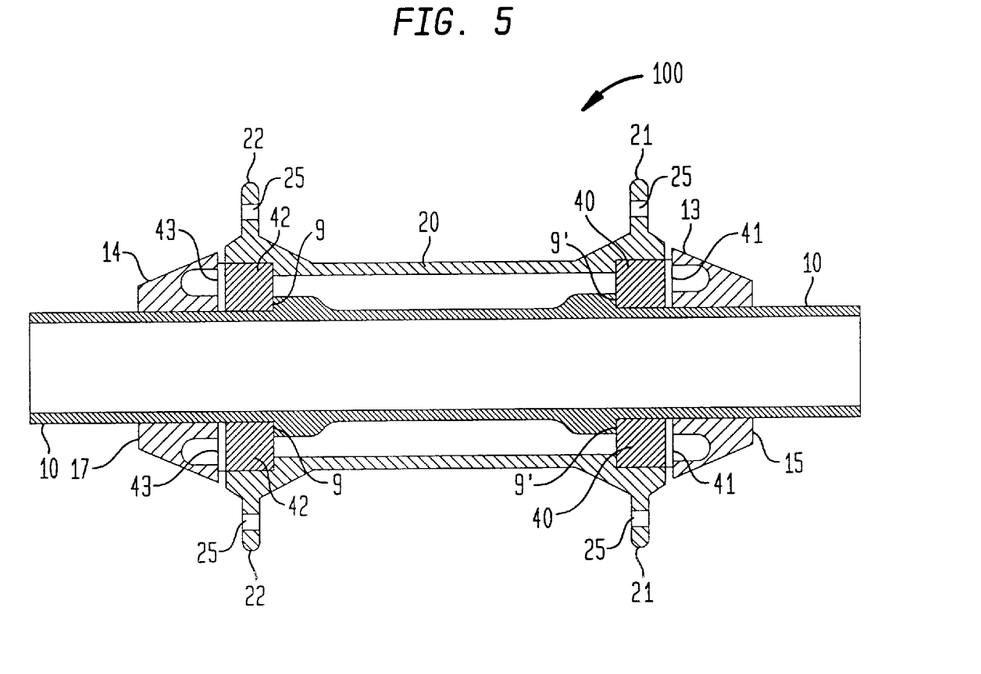
FIG. 5 shows a cross-sectional view of an alternate embodiment of the front wheel hub assembly shown in FIG. 1, showing a single through-axle.

Turning next to FIG. 5, shown is an alternate embodiment of the larger diameter hub and axle according to the present invention. As depicted, axle 10 (as compared to axles 11/12 previously described) may be a conventional single through-axle which is either solid or hollow (i.e., having a central axial cavity)—preferably axle 10 is hollow and has a diameter of 20 mm. Also, in this embodiment of the invention, axle 10 is positioned axially within hub 20, while bearings 40 and 42 are axially positioned around the ends of axle 10 and press fit between axle 10 and hub 20 until they are adjacent to exterior lips (or edges) 9/9' of axle 10, as shown. Washers 41 and 43 are positioned adjacent to bearings 40 and 42, respectively, such that bearings 40 and 42 are completely covered. Again, washers 41 and 43 protect bearings 40 and 42 from any particles, such as dirt, pebbles, etc., entering bearing 40 or 42, thereby significantly degrading or damaging bearings 40 and/or 42. Next, bearing caps 13 and 14 are press fit onto the ends of axle 10 until they are adjacent to washers 41/43 such that they hold washers 41/43 and bearings 40/42 securely in place between hub 20 and axle 10. Optionally, grease or other lubricant is used in bearings 40/42 and on washers 41/43 in order that rotation of axle 10 may occur without obstruction and with minimal friction. Also optionally, bearing caps 13 and 14 may have openings on the surface adjacent to washers 41 and 42 in order to minimize the contact surface area therebetween and in turn minimize the friction created during rotation of axle 10 with respect to hub 20.

Additionally, it is preferable that the hollow, single through-axle 10 be mounted to dropouts 80/82 using conventional quick release securing mechanisms as described below in reference to FIGS. 6 and 7. Optionally (and not shown in the figures), conventional nuts or other threaded fastening devices may be used in accordance with the present invention. On the other hand, if axle 10 is solid, its ends would preferably be threaded and long enough to extend beyond the outer edges of dropouts 80/82 such that the threaded ends could receive nuts or other threaded fastening devices, which would require conventional tools to be tightened and/or loosened.

Referring now to FIG. 6, shown is a perspective view of the front wheel hub assembly shown in FIG. 1 including a quick release mechanism in accordance with the present invention for securing wheel hub assembly 100 to dropouts 80/82 in a manner such that they may be quickly and easily removed, while providing the strength, rigidity and stability needed for off-road riding. As shown, dropouts 80/82 are attached to forks 83/84 (either rigid or suspension—preferably suspension), respectively, with fork 83 and dropout 80 (and similarly fork 84 and dropout 82) either comprising a single molded piece or comprising two separate and independent pieces securely fastened together (e.g., by screws, etc.).

As indicated by the dashed lines, wheel hub assembly 100 is generally suited to be interconnected to dropouts 80/82. As described above, in a preferred embodiment of the present invention, wheel hub assembly 100 comprises hub 20 having flanges 21/22, independent axles 11/12 and connecting tube 30 (see FIG. 4) or single through-axle 10 (see FIG. 5), bearings 40/42 (see FIGS. 4 & 5), washers 41/43 (see FIGS. 4 & 5), and bearing caps 13/14. In one embodiment (described above), axles 11/12 are press fit onto connecting tube 30 and positioned axially within hub 20. Alternatively, single through-axle 10 is used which is positioned axially within hub 20. In either embodiment, bearings 40/42, washers 41/43 and bearing caps 13/14 are positioned as described above with reference to FIGS. 4 and 5.

Generally, to mount a wheel assembly onto a fork assembly comprising forks 83/84, axle 10 (or axles 11/12) of wheel hub assembly 100 is inserted into the slots provided by dropouts 80/82. Then a fastening means is used, preferably a quick release and clamp mechanism as shown in FIGS. 6 & 7, wherein rotation of lever 64 on pivot 65 as indicated will force end nuts 61/62 toward the ends of axle 10 (or axles 11/12). Each end nut 61/62 are provided with recesses into which the ends of axle 10 (or axles 11/12) enter when the quick release clamp mechanism is engaged (or closed) This, in turn, forces end nuts 61/62 against dropouts 82/80, respectively, which lock axle 10 (or axles 11/12) in connection with forks 83/84. It will be appreciated that there may be some frictional resistance to moving lever 64 axially as required which may cause a deflection in either or both forks 83/84. The mounting of the wheel to the fork assembly 83/84 is then complete.

Additionally, as shown in both FIGS. 6 and 7, the quick release mechanism comprises rotatable lever 64, pivot 65, spindle 60, end caps 61 and 62, spacer 63, and elastic means 66 and 67 (see FIG. 7). Initially, the quick release clamping mechanism includes spindle 60 which is axially positioned through axle 10 (or axles 11/12). On one end of spindle 60 is end cap 61 which has an outer edge which is larger in diameter than the axle and an inner portion which extends into the hollow axle 10/12. End cap 61 also has a threaded hole in the center which receives a threaded end of spindle 60. The diameter of the inner portion of end cap 61 should be less than the inner diameter of axle 10/12 so that it may freely rotate therein. The opposite end of spindle 60 includes end cap 62, which is substantially the same shape and size as end cap 61, except that the hole in its center need not be threaded—it must only be greater in diameter than spindle 60. Also, the corresponding end of spindle 60 is securely fixed to lever 64 through pivot 65 which is perpendicular to spindle 60 as shown. Pivot 65 is typically a solid piece having a diameter greater that the diameter of spindle 60 to provide a strong and stable interconnection between lever 64 and spindle 60. The quick release mechanism also comprises spacer 63 having a rounded indentation which is substantially the same shape as the curvature of lever 64 at pivot 65. Lever 64 is affixed to pivot 65 on both ends (only one of which is depicted in FIGS. 6 & 7) having holes substantially the same diameter as the diameter of pivot 65. When lever 64 is disengaged (i.e., rotated counter-clockwise on pivot 65 in FIG. 7), springs 66 and 67 are extended, thereby releasing dropouts 80/82 from end caps 61/62, as described above. Conversely, when lever 64 is engaged (i.e., rotated clockwise on pivot 65 in FIG. 7), springs 66 and 67 are compressed, thereby fastening dropouts 80/82 with end caps 61/62, as described above.

Generally, spindle 60 is permanently fastened to pivot 65 in lever 64 in such a manner as to allow lever 64 to rotate clockwise or counter-clockwise on pivot 65 as indicated in FIGS. 6 and 7. This rotation allows the quick release mechanism to become engaged (closed) or disengaged (open), thereby securing wheel hub assembly 100 within dropouts 80/82 as previously described. This is accomplished through the compression of elastic means 66 and 67 (preferably springs) which forces end caps 61/62 toward axles 11/12 (or the respective ends of axle 10) and engage the outer edges of dropouts 80/82. The inner edge of dropouts 80/82 then become engaged by the grooved edges 15/17 of bearing caps 13/14 respectively. This secures wheel hub assembly 100 to dropouts 80/82.

Next, referring specifically to FIG. 7, shown is a cross-sectional view of yet another alternate embodiment of the front wheel hub assembly shown in FIG. 1, also showing a quick release mechanism in accordance with the present invention. Specifically, as shown in FIG. 7, axle 10 further comprise exterior lips 9/9' which provide a shelf for bearings 40/42 to rest against as they are press fit onto the ends of axle 10, and interior lips 8/8' which provide a shelf for elastic means 66/67 to rest against as they are compressed by end caps 61/62—the quick release mechanism would be clumsy and inefficient without interior lips 8/8'. Also, one end of spindle 60 is specifically threaded 59 for connection with end cap 61 which has an outer edge which is larger in diameter than the axle and an inner portion having a diameter less than axle 10 (or axles 11/12) so that it may extend into axle 10 (or axle 11 or 12) and freely rotate. End cap 61 has a threaded hole in its center to receive threaded end 59 of spindle 60. Also, specifically shown in FIG. 7 are bearing caps 13/14 which may alternatively have raised edges 13'/14' which are directly adjacent to bearings 40/42 (i.e., not separated by washers 41/43). Alternatively, and not shown, bearing caps 13/14 may have solid surfaces such that the entire surface of washers 41/43 are in contact with the surfaces of bearing caps 13/14.

Furthermore, it will be appreciated that the invention can be achieved without the use of the quick release system. This could be accomplished by using nuts or other threadably fastenable devices on the ends of spindle 60, which can be tightened and loosened with conventional tools. This could also be accomplished by manufacturing the axles 11 and 12 (or axle 10) such that they extend beyond the edges of the dropout and having threads on the ends of the axles 11 and 12 (or axle 10) which can receive nuts or other threadably fastening devices, which can be tightened and loosened with conventional tools.

The following Front Axle Connection Stiffness Analysis was performed to demonstrate that the new axle connection design according to the present invention offers substantially greater stiffness than conventional axle designs. As will be evident from the following tables, the new connection of the present invention provides improved functionality at high velocity and impact loads.

The analysis was performed using the following front fork models: (1) fork φ30 MTB Z1 BAM 99; and (2) fork φ30 GT BAM.

The following elements are the references used in the coordinate system (using the right hand rule) for performing the analysis:

(1) origin: the center of the axle;

(2) X axis: the normal direction to the fork axis;

(3) Y axis: the transversal direction to the fork axis; and (4) Z axis: the direction of the fork axis.

It is important to note here the differences between the axle connection designs as used in the performance of this stiffness analysis. First, the width connection extremity on the wheel axis differed significantly. That is, the New Axle design is 20.0 mm while the Old Axle designs are 8.6 mm. Second, the position of the axle-dropout connection with respect to the fork differs greatly. In the New Axle design it is positioned in front of the fork axis, while in the Old Axle design it was positioned to the side of the fork axis. Third, the diameter of the wheel axle differed significantly. That is, the New Axle design is 20.0 mm while the Old Axle designs are 9.0 mm. As described previously, these are some of the novel aspects of the present invention. Lastly, the wheel axle length was 100.0 mm for both the New Axle and the Old Axle designs.

It is also important to note here that both axle designs comprise the same material composition of Aluminum. Table 1 below demonstrates the mechanical properties of Aluminum, the material used in both the New Axle and Old Axle designs used in this stiffness analysis.

TABLE 1

MECHANICAL PROPERTIES OF ALUMINUM - OLD & NEW AXLE

| Density | ρ | 2.7 kg/dm³ |
|---|---|---|
| Yield stress | σ-sner | 280 N/mm² |
| Poisson ratio | ν | 0.33 |
| Longitudinal elastic modulus | E | 70,000 N/mm² |
| Shear elastic modulus | G | 70,000 N/mm² |

During the stiffness analysis, various loads were applied to both the New Axle and the Old Axle samples. The three different loads applied were: (1) braking load; (2) frontal impact load; and (3) vertical jump load. These were applied as shown below in Table 2.

TABLE 2

| APPLIED LOADS - OLD & NEW AXLE | | | |
|---|---|---|---|
| LoadType | Fx | Fy | Fz |
| Braking | 550 N | 200 N | 1200 N |
| Frontal Impact | 1000 N | 200 N | 750 N |
| Vertical Jump | −500 N | 200 N | 1500 N |

The above mentioned mechanical property values (Table 1) have been calculated at the center of the wheel axle, while the above mentioned induced loads (Table 2) were calculated on the axle-dropout connection.

To analyze the efficiency of the New Axle design, the critical section of the axle-dropout interface have been taken into account. These are the sections with the lowest stiffness values and therefore result in the maximum deflections.

The following tables demonstrate the initial data used in the stiffness calculations, as well as the stress and stiffness results obtained and calculated First, Tables 3A & 3B present the geometrical data for each axle design.

TABLE 3A

GEOMETRICAL SECTION DATA - NEW AXLE

Section center of gravity referred to origin coordinate system

| | | |
|---|---|---|
| Distance X | x | 10 mm |
| Distance Y | y | 50 mm |
| Distance Z | z | 9 mm |

Rotation angle of the section referred to origin coordinate system

| | | |
|---|---|---|
| Rotation around X | α | 0 deg |
| Rotation around Y | β | 45 deg |
| Rotation around Z | γ | 0 deg |
| Bending stress amplification factor | αkf | 1 |
| Shear stress amplification factor | αkt | 1 |
| Area | A | 500 mm² |
| Shear area X | Sax | 333 mm² |
| Shear area Y | Say | 333 mm² |
| Inertial moment X | Ix | 26,042 mm⁴ |
| Inertial moment Y | Iy | 16,667 mm⁴ |
| Polar inertial moment | Jt | 38,825 mm⁴ |
| Resistence bending modulus X | Wx | 2,083 mm³ |
| Resistence bending modulus Y | Wy | 1,667 mm³ |
| Resistence torsional modulus | Wt | 3,106 mm³ |

TABLE 3B

GEOMETRICAL SECTION DATA - OLD AXLE

Section center of gravity referred to origin coordinate system

| | | |
|---|---|---|
| Distance X | x | 10 mm |
| Distance Y | y | 38 mm |
| Distance Z | z | 12 mm |

Rotation angle of the section referred to origin coordinate system

| | | |
|---|---|---|
| Rotation around X | α | 0 deg |
| Rotation around Y | β | 45 deg |
| Rotation around Z | γ | 0 deg |
| Bending stress amplification factor | αkf | 1 |
| Shear stress amplification factor | αkt | 1 |
| Area | A | 170 mm² |
| Shear area X | Sax | 113 mm² |
| Shear area Y | Say | 113 mm² |
| Inertial moment X | Ix | 8854 mm⁴ |
| Inertial moment Y | Iy | 656 mm⁴ |
| Polar inertial moment | Jt | 2,620 mm⁴ |
| Resistence bending modulus X | Wx | 708 mm³ |
| Resistence bending modulus Y | Wy | 193 mm³ |
| Resistence torsional modulus | Wt | 771 mm³ |

Second, after the induced stress has been applied, the stress calculation has been made for each of the three load types (i.e., braking, frontal impact and vertical jump)—the results are shown below in Tables 4A, 4B, 5A, 5B, 6A & 6B. Note that the stress calculation has been carried out using the S. Venenate theory, and the different lengths of the two sections have been taken into account. As will be seen, much better stress result appear for the New Axle than for the Old Axle design.

TABLE 4A

INDUCED STRESS CALCULATION - NEW AXLE BRAKING LOAD TYPE

Forces and moments on the section

| | | |
|---|---|---|
| Normal force | N | 549.19 N |
| Shear force | T1 | 655.01 N |
| Shear force | T2 | 100.00 N |
| Bending moment | M1 | 15.07 Nm |
| Bending moment | M2 | 8.48 Nm |
| Torsional moment | Mt | 8.22 Nm |

TABLE 4A-continued

INDUCED STRESS CALCULATION - NEW AXLE BRAKING LOAD TYPE

Stress calculation

| | | |
|---|---|---|
| Stress due to normal force | $\sigma_N$ | 1.10 N/mm² |
| Stress due to bending moment M1 | $\sigma_{F1}$ | 7.24 N/mm² |
| Stress due to bending moment M2 | $\sigma_{F2}$ | 5.08 N/mm² |
| Torsion stress due to Mt | $\tau_T$ | 2.65 N/mm² |
| Shear stress due to T1 | $\tau_1$ | 1.97 N/mm² |
| Shear stress due to T2 | $\tau_g$ | 0.30 N/mm² |
| Von Mises stress (x αk) | σ-VM | 15.89 N/mm² |

TABLE 4B

INDUCED STRESS CALCULATION - OLD AXLE BRAKING LOAD TYPE

Forces and moments on the section

| | | |
|---|---|---|
| Normal force | N | 549.19 N |
| Shear force | T1 | 655.01 N |
| Shear force | T2 | 100.00 N |
| Bending moment | M1 | 22.34 Nm |
| Bending moment | M2 | 9.30 Nm |
| Torsional moment | Mt | 11.73 Nm |

Stress calculation

| | | |
|---|---|---|
| Stress due to normal force | $\sigma_N$ | 3.23 N/mm² |
| Stress due to bending moment M1 | $\sigma_{F1}$ | 31.56 N/mm² |
| Stress due to bending moment M2 | $\sigma_{F2}$ | 48.19 N/mm² |
| Torsion stress due to Mt | $\tau_T$ | 15.21 N/mm² |
| Shear stress due to T1 | $\tau_1$ | 5.80 N/mm² |
| Shear stress due to T2 | $\tau_g$ | 0.88 N/mm² |
| Von Mises stress (x αk) | σ-VM | 91.23 N/mm² |

TABLE 5A

INDUCED STRESS CALCULATION - NEW AXLE FRONTAL IMPACT LOAD TYPE

Forces and moments on the section

| | | |
|---|---|---|
| Normal force | N | 622.45 N |
| Shear force | T1 | 581.75 N |
| Shear force | T2 | 100.00 N |
| Bending moment | M1 | 9.45 Nm |
| Bending moment | M2 | 8.25 Nm |
| Torsional moment | Mt | 13.84 Nm |

Stress calculation

| | | |
|---|---|---|
| Stress due to normal force | $\sigma_N$ | 1.24 N/mm² |
| Stress due to bending moment M1 | $\sigma_{F1}$ | 4.53 N/mm² |
| Stress due to bending moment M2 | $\sigma_{F2}$ | 4.95 N/mm² |
| Torsion stress due to Mt | $\tau_T$ | 4.16 N/mm² |
| Shear stress due to T1 | $\tau_1$ | 1.75 N/mm² |
| Shear stress due to T2 | $\tau_g$ | 0.30 N/mm² |
| Von Mises stress (x αk) | σ-VM | 15.56 N/mm² |

TABLE 5B

INDUCED STRESS CALCULATION - OLD AXLE FRONTAL IMPACT LOAD TYPE

Forces and moments on the section

| | | |
|---|---|---|
| Normal force | N | 622.45 N |
| Shear force | T1 | 581.75 N |
| Shear force | T2 | 100.00 N |
| Bending moment | M1 | 14.02 Nm |
| Bending moment | M2 | 9.75 Nm |
| Torsional moment | Mt | 20.06 Nm |

TABLE 5B-continued

INDUCED STRESS CALCULATION - OLD AXLE FRONTAL IMPACT LOAD TYPE

Stress calculation

| | | |
|---|---|---|
| Stress due to normal force | $\sigma_N$ | 3.66 N/mm² |
| Stress due to bending moment M1 | $\sigma_{F1}$ | 19.80 N/mm² |
| Stress due to bending moment M2 | $\sigma_{F2}$ | 50.52 N/mm² |
| Torsion stress due to Mt | $\tau_T$ | 26.01 N/mm² |
| Shear stress due to T1 | $\tau_1$ | 5.15 N/mm² |
| Shear stress due to T2 | $\tau_g$ | 0.88 N/mm² |
| Von Mises stress (x αk) | σ-VM | 92.48 N/mm² |

TABLE 6A

INDUCED STRESS CALCULATION - NEW AXLE VERTICAL JUMP LOAD TYPE

Forces and moments on the section

| | | |
|---|---|---|
| Normal force | N | 606.72 N |
| Shear force | T1 | 79.51 N |
| Shear force | T2 | 100.00 N |
| Bending moment | M1 | 18.82 Nm |
| Bending moment | M2 | 9.76 Nm |
| Torsional moment | Mt | 7.59 Nm |

Stress calculation

| | | |
|---|---|---|
| Stress due to normal force | $\sigma_N$ | 1.21 N/mm² |
| Stress due to bending moment M1 | $\sigma_{F1}$ | 9.04 N/mm² |
| Stress due to bending moment M2 | $\sigma_{F2}$ | 5.85 N/mm² |
| Torsion stress due to Mt | $\tau_T$ | 2.44 N/mm² |
| Shear stress due to T1 | $\tau_1$ | 2.31 N/mm² |
| Shear stress due to T2 | $\tau_g$ | 0.30 N/mm² |
| Von Mises stress (x αk) | σ-VM | 18.33 N/mm² |

TABLE 6B

INDUCED STRESS CALCULATION - OLD AXLE VERTICAL JUMP LOAD TYPE

Forces and moments on the section

| | | |
|---|---|---|
| Normal force | N | 606.72 N |
| Shear force | T1 | 769.51 N |
| Shear force | T2 | 100.00 N |
| Bending moment | M1 | 27.89 Nm |
| Bending moment | M2 | 10.50 Nm |
| Torsional moment | Mt | 10.81 Nm |

Stress calculation

| | | |
|---|---|---|
| Stress due to normal force | $\sigma_N$ | 3.57 N/mm² |
| Stress due to bending moment M1 | $\sigma_{F1}$ | 39.39 N/mm² |
| Stress due to bending moment M2 | $\sigma_{F2}$ | 54.40 N/mm² |
| Torsion stress due to Mt | $\tau_T$ | 11.02 N/mm² |
| Shear stress due to T1 | $\tau_1$ | 6.81 N/mm² |
| Shear stress due to T2 | $\tau_g$ | 0.88 N/mm² |
| Von Mises stress (x αk) | σ-VM | 104.38 N/mm² |

Next, the following tables demonstrate the fundamental stiffness in both the New Axle and Old Axle designs, which shows the extent of the improved stiffness and rigidity of the wheel hub/axle assembly of the present invention over the conventional designs.

TABLE 7A

STIFFNESS - NEW AXLE

Geometrical Analysis

| | | | |
|---|---|---|---|
| Length of the constant section | L | 5 | mm |
| Area | A | 500 | mm² |
| Shear area X | Sax | 333 | mm² |
| Shear area Y | Say | 333 | mm² |
| Inertial moment X | Ix | 16,667 | mm⁴ |
| Inertial moment Y | Iy | 2,6042 | mm⁴ |
| Polar inertial moment | Jt | 38,825 | mm⁴ |

Stiffness

| | | | |
|---|---|---|---|
| Longitudinal stiffness | $K_N$ | 7.0E+6 | N/mm |
| Bending stiffness X | $K_{F1}$ | 233.3E+6 | N/mm |
| Bending stiffness Y | $K_{F2}$ | 364.6E+6 | N/mm |
| Torsional stiffness | $K_T$ | 543.6E+6 | Nmm |

TABLE 7B

STIFFNESS - OLD AXLE

Geometrical Analysis

| | | | |
|---|---|---|---|
| Length of the constant section | L | 5 | mm |
| Area | A | 170 | mm² |
| Shear area X | Sax | 113 | mm² |
| Shear area Y | Say | 113 | mm² |
| Inertial moment X | Ix | 655 | mm⁴ |
| Inertial moment Y | Iy | 8,854 | mm⁴ |
| Polar inertial moment | Jt | 2,620 | mm⁴ |

Stiffness

| | | | |
|---|---|---|---|
| Longitudinal stiffness | $K_N$ | 1.3E+6 | N/mm |
| Bending stiffness X | $K_{F1}$ | 6.1E+6 | N/mm |
| Bending stiffness Y | $K_{F2}$ | 68.9E+6 | N/mm |
| Torsional stiffness | $K_T$ | 20.4E+6 | Nmm |

In conclusion, Table 8 below shows the results of the stiffness analysis described in the tables above.

TABLE 8

TEST RESULTS - INCREASED STIFFNESS

| | | |
|---|---|---|
| Longitudinal stiffness | $\Delta K_N$ | 529% |
| Bending stiffness X | $\Delta K_{F1}$ | 4,580% |
| Bending stiffness Y | $\Delta K_{F2}$ | 529% |
| Torsional stiffness | $\Delta K_T$ | 2,667% |

Shown in Table 8 is the increased fundamental stiffness (in percentages) of the wheel hub/axle design of the present invention (New Axle) over conventional axle designs (Old Axle). The increase in bending stiffness in the "F1" direction is primarily due to the increased width of the axle-dropout connection of the present invention, while the difference in the torsional stiffness is primarily due to the increased axle diameter of the present invention.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the wheel hub assembly of the present invention is capable of being embodied in other forms without departing from its essential characteristics.

What is claimed is:

1. A wheel hub assembly for interconnecting a wheel to a fork assembly on a bicycle, said wheel hub assembly comprising:
   a hub having first and second flanges extending radially from the axis of said hub for interconnecting said hub to a wheel rim;
   a through axle positioned axially within said hub such that ends of said axle extend therefrom, said axle having a diameter greater than 9 millimeters;
   first and second bearings positioned on said ends of said axle;
   first and second bearing caps positioned on said ends of said axle such that said first and second bearings are held in place; and
   fastening means for securing said wheel hub assembly to said fork assembly;
   wherein said hub comprises attachment means for connecting a disc brake apparatus to said wheel hub assembly.

2. A wheel hub assembly according to claim 1, wherein said axle is at least fifteen millimeters in diameter.

3. A wheel hub assembly according to claim 1, wherein said axle is at least twenty millimeters in diameter.

4. A wheel hub assembly according to claim 1, wherein said first and second bearing caps are grooved to secure said wheel hub assembly to said fork assembly.

5. A wheel hub assembly according to claim 1, wherein said fastening means is part of said fork assembly.

6. A wheel hub assembly according to claim 1, wherein said fork assembly comprises first and second dropouts for attachment of said wheel hub assembly to said fork assembly.

7. A wheel hub assembly according to claim 6, wherein said first and second dropouts each have an opening of greater than 9 millimeters.

8. A wheel hub assembly according to claim 6, wherein said first and second dropouts each have a width of greater than nine millimeters.

9. A wheel hub assembly according to claim 1, wherein said axle comprises a plurality of sections.

10. A wheel hub assembly according to claim 1, wherein said fastening means comprises a spindle, lever, spacer, first and second end caps, and at least one elastic means for allowing compression and expansion of said fastening means through rotation of said lever.

11. A wheel hub assembly according to claim 10, wherein said spindle is positioned axially through said axle such that said spindle extends from each said end of said axle.

12. A wheel hub assembly according to claim 11, wherein said lever is rotatably affixed to a first end of said spindle.

13. A wheel hub assembly according to claim 12, wherein said first end cap is affixed to said first end of said spindle, and said spacer is positioned adjacent to said lever such that said spacer is positioned between said first end cap and said lever.

14. A wheel hub assembly according to claim 10, wherein each said elastic means is positioned axially around said spindle within said axle.

15. A wheel hub assembly according to claim 1, wherein said first and second bearing caps are press fit onto said axle.

16. A wheel hub assembly according to claim 1, wherein said first and second bearing caps are screwed onto said axle.

17. A wheel hub assembly according to claim 1, wherein said axle comprises at least three independent sections.

18. A wheel hub assembly according to claim 17, wherein said three independent sections are first and second axle end sections and axle connecting section.

19. A wheel hub assembly according to claim 18, wherein said first axle end section is press fit onto a first end of said axle connecting section and said second axle end section is press fit onto a second end of said axle connecting section.

20. A wheel hub assembly according to claim 19, wherein said first and second ends of said connecting section form said first and second interior edges.

21. A wheel hub assembly according to claim 19, wherein said first and second axle end sections comprise said first and second exterior edges.

22. An apparatus for providing a quick release connection between a bicycle front wheel and a bicycle front fork assembly, said apparatus comprising:
   a hub having first and second flanges extending radially from the axis of said hub and positioned at either end of said hub;
   a three-piece axle positioned axially within said hub and extending therefrom and having a first axle end, a second axle end and connecting tube, said axle ends having an external diameter greater than nine millimeters, said three-piece axle comprising first and second interior edges and first and second exterior edges;
   first and second bearing assemblies positioned on said first and second axle ends; and
   fastening means for securing said hub and said three-piece axle to said fork assembly.

23. A wheel hub assembly according to claim 22, wherein said first and second bearing assemblies each comprise a bearing, a washer, and a bearing cap.

24. A wheel hub assembly according to claim 22, wherein said first flange or said second flange interconnects said hub to a wheel rim.

25. A wheel hub assembly according to claim 22, wherein said three-piece axle is greater than 9 millimeters in diameter.

26. A wheel hub assembly according to claim 22, wherein said axle is at least twenty millimeters in diameter.

27. A wheel hub assembly according to claim 22, wherein said fork assembly comprises first and second dropouts each having a width of at least twenty millimeters and a corresponding increased connection surface area with said first and second axle ends.

28. A wheel hub assembly according to claim 27, wherein said first and second dropouts comprise fastening means for attachment to said first and second axle ends.

29. A wheel hub assembly according to claim 22, wherein said fastening means comprises a spindle, lever, spacer, first and second end caps, and at least one elastic means for allowing compression and expansion of said fastening means through rotation of said lever.

30. A wheel hub assembly according to claim 29, wherein a first end of said spindle has said lever rotatably affixed thereto, said spacer being positioned axially around said spindle adjacent to said lever, said first end cap positioned axially around said spindle adjacent to said spacer and said axle end, said first elastic means being positioned axially around said spindle within said axle such that it compresses or expands through rotation of said lever.

* * * * *